DIGITAL-TO-ANALOG CONVERTER

Filed May 9, 1963

Inventors.
William J. Kopek, &
John E. Stifle.
By. Merriam, Smith & Marshall,
Attys.

United States Patent Office 3,247,397
Patented Apr. 19, 1966

3,247,397

DIGITAL-TO-ANALOG CONVERTER

William J. Kopek, Mountain View, Calif., and John E. Stifle, Paxton, Ill., assignors to The University of Illinois Foundation, a non-profit corporation of Illinois Filed May 9, 1963, Ser. No. 279,267
1 Claim. (Cl. 307—88.5)

This invention relates to circuitry adapted for translating digital signals into analog signals.

In the art of utilizing digital computers and data processing equipment suitable for data processing, it has been found that many of the signals from the control equipment are analog in form. Much of the equipment used for such controlling operations requires analog input signals. The digital computer, however, requires signals of discrete levels to represent a variable. Consequently, many and special means are utilized to convert the analog signals to discrete digital levels. Other components are used to translate such digital signals into analog signals. This invention is concerned particularly with the latter form of device.

As this invention will be described, it utilizes certain selected switching techniques whereby constant current generators can be appropriately connected in or out of a coupling network. The circuitry provided so functions that the sum of the currents produced by such constant current generators at the output provides an analog representation of the input digital signal information. In prior art devices and circuits, it has been found, in many instances, that a high degree of accuracy is difficult to achieve in such circuitry where the switching extends beyond the seven to eight bit resolution. Many times, to overcome such defects, recourse is had to supplemental relay and other electro-mechanical devices which, of themselves, impose limitations on both the speed of operation and the equipment life.

As the invention is illustrated herein, it can be assumed that the disclosure is directed to a digital-to-analog converter using only solid state components for control, and so functioning that through the use of a precision ladder type network, the currents from selected constant current generators may appropriately be selected with switching and summed at the output.

Figure 1:
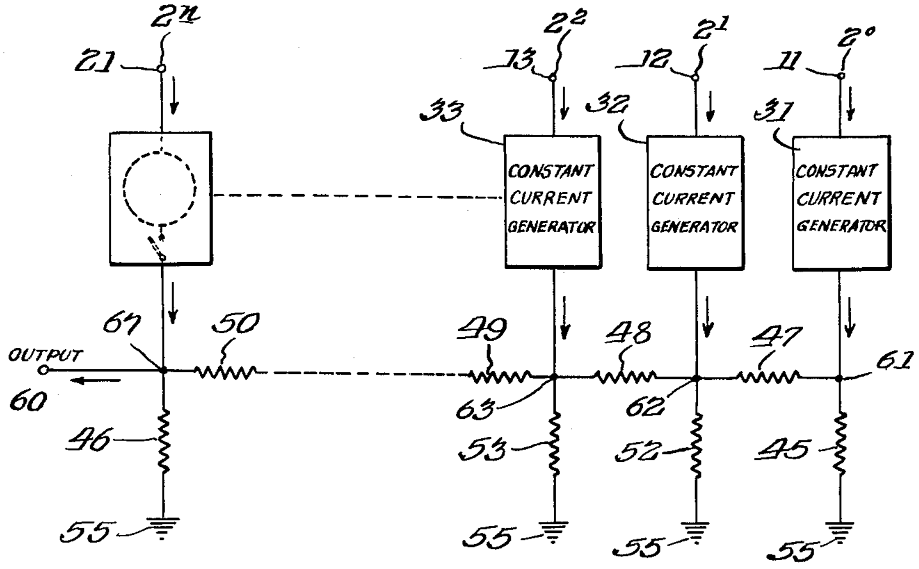
Figure 2:
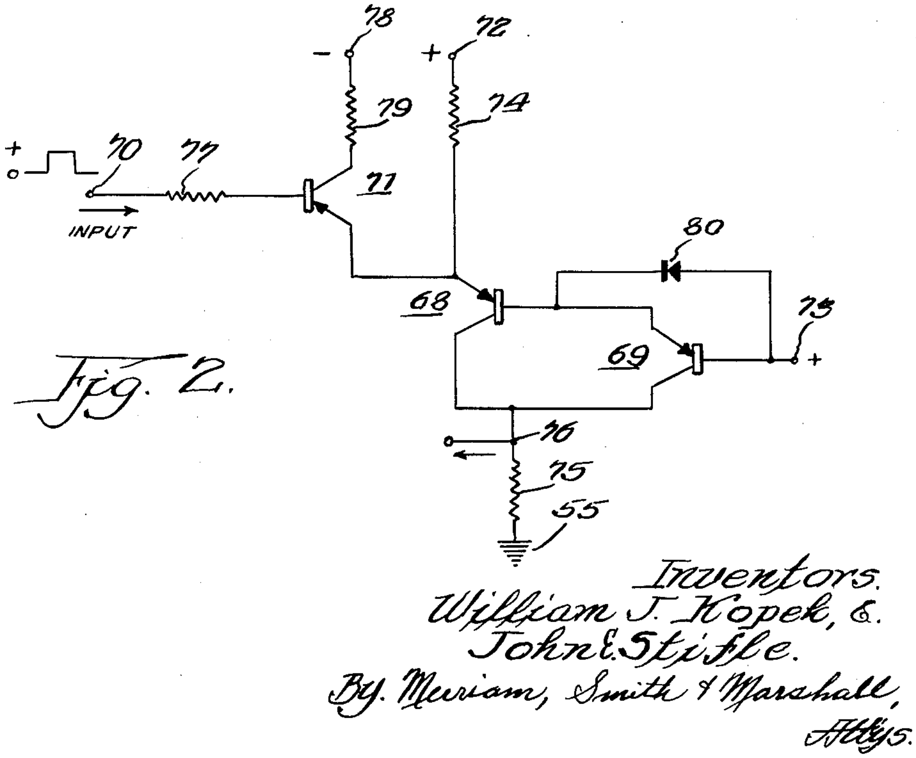

The invention has been shown illustratively in its preferred form and in diagrammatic fashion by the accompanying drawings in which FIG. 1 illustrates one suitable form of ladder network connected in cooperative relationship with a plurality of input constant current devices assumed to respond to binary signal information at various powers of 2 varying between $2^0$ to $2^n$; and, FIG. 2 illustrates schematically a form of constant current generator device or circuit controlled by a suitable gating transistor.

Referring now to the drawings for an understanding of the operation of the circuitry of the invention, digital input pulses of binary form are supplied at the input terminals 11, 12, 13 through 21 (illustratively representing binary $2^0$, $2^1$, $2^2$ and so on to $2^n$). The signals are supplied from the input terminals to suitable constant current generators 31, 32, 33 to 41 for the purpose of switching these generators to an "on" state or to an "off" state, as the case may be, in accordance with the presence or absence of signals. Under the circumstances, each constant current generator corresponds to a bit in a binary number.

The output signal from each constant current generator is supplied in such a way that equal current is fed into the nodes of a suitable constant impedance precision ladder network, as indicated. The ladder network comprises a plurality of resistor elements of which terminating resistors 45 and 46 are each of like value and each correspond in value to the connecting resistors 47, 48, 49 and 50, for instance. The resistors constituting the vertical members of the ladder, and shown as 52, 53 and in any suitable number thereafter depending upon the number bits of analog information supplied, are each of a value twice that of the connecting resistors and the terminating resistors. Output voltage is derived at the output terminal point 60 and appears as an analog signal. The characteristic resistance of the ladder is so chosen that external loading does not affect the accuracy of the ladder network and hence of the converter.

Referring now to the current path from the various constant current generators 31 through 41, for instance, the output current under such circumstances as supplied to the output terminal point 60 is the weighted sum of the individual generator currents. It can be shown that this current will be directly proportional to the number of generators connected at any instant into the circuit. Thus, the significance of any selected number of generators in the converter consequently becomes an analog representation of the individual input digital levels. Illustratively, if the ladder comprised say only three constant current generators, such as 31, 32 and 33, then at point 61 two-thirds of the current will flow through resistor 45 to ground 55 and one-third to the left through the remainder of the ladder. At point 62 it can be seen that one-third of the current flow from generator 32 will be through the resistor 52 to ground 55, one-third will be through the resistor 48 to the left, as shown, and one-third will be through resistor 47 to the right as shown. Similarly, at point 63 a generally like division of current occurs. A like condition results through all stages to stage *n* where the currents flow say to point 67.

In the arrangement upon which this invention is based, there is a control of the current flow through the constant current generator provided by keying the constant current generator under controlled input signals of desired character. In FIG. 2 a compound gating circuit connection is provided through the use of a pair of transistors 68 and 69. With these transistors a control is established from an input terminal point 70 (like any of the points 11, 12, 13 and so on) by way of a keying transistor 71. Normally the circuit is so provided that the supply voltages, as established at terminals 72 and 73, and of the polarity indicated, together with precision resistor elements 74 and 75, establish the normal current flow in such a way that the current flowing through the resistor 75 to ground is represented as the sum of the collector currents flowing through each of the transistors 68 and 69. In the indicated circuit it will be appreciated that the junction point 76, for instance, may correspond (depending upon which constant current generator is represented by the combination of transistors 68 and 69), to one of the points 61, 62, 63, and so on.

The gating transistor 71, which is supplied at terminal point 70 with the digital information constituted by pulses of one of the binary powers of 2, serves to gate the constant current generator to an "on" or an "off" state, depending upon the presence or absence of the corresponding bit in the binary value being converted. So connected, the pulse applied at the terminal 70 is supplied through resistor 77 to the base of transistor 71. This transistor is usually forward biased by way of a source (not shown) connected at terminal point 78 and supplying the negative polarity voltage relative to ground through resistor 79 to the collector electrode of the transistor. The emitter of transistor 71 connects to the emitter of transistor 68. The base of transistor 69 is positively biased by a suitable source (not shown) connected to terminal 73. A voltage from source point 73 is also supplied through the diode 80 to the junction point of the base of transistor 68 and the emitter of transistor 69. The collector electrodes of each of transistor 68 and 69, as above noted, are suitably connected together so that with the transistors 68 and 69 being caused to pass current during the presence of the more positive voltage state of two possible states at the base of transistor 71 (this corresponding to the bit which the switch represents in the binary number being converted) allows current to flow into two transistors 68 and 69 and on into the collector circuit.

As the circuit is set up, the less positive of two voltages of the character indicated schematically adjacent the terminal 70, appears that the base of transistor 71 corresponds to the absence of a bit which the switch represents in the binary number being converted. This, therefore, forward biases the transistor 71 and carries the emitter of transistor 68 just slightly above some selected voltage, because of the clamping action of the diode and the emitter to base voltage drop in the transistor. Under these conditions, emitter to base current flows through the transistor 71 and does not reach the collector circuit of the combination of transistors 68 and 69. It is, therefore, in accordance whether or not the polarity of the pulse applied at the input terminal 70 is of the more positive or less positive of its two possible conditions that the current flow can affect the ladder network and provide the analog representation. The combination of the several transistors as connected removes substantially all variances which otherwise might tend to occur due to switching and residual errors are thus precluded.

Various modifications of the circuit, of course, may be made within the spirit and teachings of what is here disclosed and set out as an illustration of the invention in one of its preferred forms.

What is claimed and desired to be secured by Letters Patent is:

A constant current generator comprising a pair of transistor elements, one of said transistor elements having its base positively biased, its collector connected to a load circuit and its emitter connected to the base of the second transistor, a diode rectifier having its anode positively biased from the bias source for said other transistor and having its anode connected also to the base of the first transistor and having its cathode connected to the emitter of the first transistor and to the base of the second transistor, the collector of the second transistor being connected to the collector of the first transistor and to the load circuit, means to supply positive bias to the emitter of the second transistor, a third keying transistor having its emitter connected to the emitter of the second transistor and its collector negatively biased, means to bias the base of the third transistor negatively in the absence of control signals thereby to preclude current flow in the second transistor and means to produce current flow through the third transistor upon energization by supplied signals thereby to key current through the combination of the first and second transistors to the load circuit.

References Cited by the Examiner

UNITED STATES PATENTS 3,114,872 12/1963 Allard ______________ 307—88.5

OTHER REFERENCES

Page 17, December 1960—IBM Technical Disclosure Bulletins (1) vol. 2, No. 1, June 1959, page 36 and (2) vol. 3, No. 7.

MALCOLM A. MORRISON, *Primary Examiner.*